United States Patent [19]

Leppek

[11] Patent Number: 4,881,784

[45] Date of Patent: Nov. 21, 1989

[54] ABS PRESSURE APPLY ALGORITHM

[75] Inventor: Kevin G. Leppek, West Bloomfield, Mich.

[73] Assignee: General Motors Corporation, Detroit, Mich.

[21] Appl. No.: 305,574

[22] Filed: Feb. 3, 1989

[51] Int. Cl.$^4$ .................................................. B60T 8/58
[52] U.S. Cl. ..................................... 303/100; 303/104; 303/105; 303/DIG. 4; 303/110
[58] Field of Search ............... 303/100, 102, 103, 104, 303/105, 106, 91, 107, 108, 109, 110, 61–63, DIG. 3, DIG. 4; 180/197

[56] References Cited

U.S. PATENT DOCUMENTS

| | | | |
|---|---|---|---|
| 3,494,671 | 2/1970 | Slavin et al. | 303/106 |
| 3,674,320 | 7/1972 | Howard et al. | 303/106 X |
| 3,736,435 | 5/1973 | Runge et al. | 303/106 X |
| 3,790,227 | 2/1974 | Dozier | 303/105 X |
| 3,804,469 | 4/1974 | Takeuchi et al. | 303/106 |
| 3,806,204 | 4/1974 | Sutton | 303/106 |
| 3,822,921 | 7/1974 | Jones | 303/106 |
| 3,832,013 | 8/1974 | Davis et al. | 303/106 |
| 4,033,634 | 7/1977 | Arai et al. | 303/110 X |
| 4,080,007 | 3/1978 | Acker et al. | 303/104 |
| 4,135,697 | 1/1979 | Williams et al. | 303/106 |
| 4,183,588 | 1/1980 | Snyder | 303/110 |
| 4,653,816 | 3/1987 | Lin | 303/106 |
| 4,664,453 | 5/1987 | Kade . | |
| 4,673,225 | 6/1987 | Kade | 303/DIG. 4 X |
| 4,673,226 | 6/1987 | Every et al. | 303/109 |
| 4,755,945 | 7/1988 | Kade et al. | 303/96 X |
| 4,761,741 | 8/1988 | Agarwal et al. | 180/197 X |
| 4,783,127 | 11/1988 | Kade et al. | 303/100 |

Primary Examiner—Douglas C. Butler
Attorney, Agent, or Firm—Howard N. Conkey

[57] ABSTRACT

A brake control system is described that maximizes vehicle braking efficiency by maximizing the amount of time spent cycling pressure at or near the optimal pressure for the road surface. Upon detecting an incipient wheel lock condition, the system measures the optimal pressure for the road surface and relieves pressure. Once wheel recovery is sensed, the system reapplies pressure to a significant fraction of the optimal pressure and increases pressure gradually from that point. If a change to a higher coefficient surface occurs while the system is modulating brake pressure, the system detects that surface transition and rapidly increases brake pressure to quickly arrive at the new optimal pressure.

3 Claims, 3 Drawing Sheets

ABS PRESSURE APPLY ALGORITHM

BACKGROUND OF THE INVENTION

This invention relates to an antilock control system for vehicle wheel brakes. When the brakes of a vehicle are applied, a braking force between the wheel and the road surface is generated that is dependent upon various parameters including the road surface conditions and the amount of slip between the wheel and the road surface. The braking force increases as slip increases, until a critical value of slip is surpassed. Beyond this critical slip value, the braking force decreases and the wheel rapidly approaches lockup. If the wheel is allowed to lock, unstable braking occurs, and vehicle stopping distance on uniform nondeformable surfaces increases. Thus, stable vehicle braking occurs when wheel slip does not exceed this critical slip value. An antilock control system achieves stable braking and minimizes stopping distance by detecting incipient wheel lock. One criteria that is used to sense incipient wheel lock is excessive wheel deceleration and/or excessive wheel slip. Once an incipient wheel lock has been detected, pressure is relieved at the wheel brake. Upon releasing the brake pressure, the wheel will begin to recover from the incipient wheel lock condition. When the wheel has substantially recovered, brake pressure is reapplied. One criteria that is typically used to indicate wheel recovery is a positive wheel acceleration. Reapplication of brake pressure results in the wheel again approaching lockup and the wheel cycle process is repeated. Brake force and vehicle braking efficiency are maximized during braking by cycling the brake pressure around an optimum pressure for the particular road surface. This optimum pressure corresponds to the brake force generated while at the critical wheel slip value. Since the brake force is a function of wheel brake pressure and road surface conditions, the optimum brake force and the corresponding optimum brake pressure will change as road surface conditions vary. To optimize vehicle braking during a stop on a changing or non-uniform road surface, the antilock control system must be able to respond to each road surface and seek a new optimal pressure quickly to insure maximum braking efficiency.

While most systems execute wheel cycle control based solely upon vehicle motion parameters such as wheel slip and acceleration, there is a known system which measure the optimal brake pressure corresponding to the brake force generated while at the critical wheel slip value during the aforementioned wheel cycling. This system then utilizes the optimal brake pressure value as a target, operating to reapply to a fraction (i.e. 80%) of the optimum pressure and then increasing pressure gradually until reaching the optimum again, at which point the system senses another incipient lock and repeats the wheel cycle process. Because pressure is gradually increased from a significant fraction of the previously determined optimum pressure, the system can cycle brake pressure at or near the optimum value for substantial lengths of time while the optimal pressure value remains relatively constant. Thus, this type of antilock control system will provide maximum vehicle braking efficiency on uniform surfaces. However, if the surface coefficient increases above that which the system was previously operating on, the corresponding optimal pressure will also increase. Gradually increasing pressure from a value which represents a significant fraction of the optimal pressure for the previous surface, but which does not represent a significant fraction of the optimal pressure for the new surface, will produce a prolonged period of below optimal braking force. Until the pressure has increased to a value which is a significant fraction of the new optimal pressure value, the vehicle will not be braking efficiently, and stopping distance will be compromised as a result. Thus, it is desirable to respond quickly to an increase in the surface coefficient, reaching the new optimal pressure before braking efficiency decreases.

SUMMARY OF THE INVENTION

This invention provides a means for rapidly reacting to surface coefficient increases, while retaining the ability to produce substantial lengths of time at or near the optimal pressure for the road surface. The invention determines instantaneous wheel brake pressure, reapplies to the optimum wheel brake pressure during each wheel cycle and responds to road surface coefficient transitions by quickly establishing a new optimum pressure, thereby optimizing vehicle braking efficiency on both uniform and changing road surfaces. The invention accomplishes this by increasing pressure gradually from a significant percentage of the measured optimal brake pressure until an incipient wheel lock condition is detected. While operating on a constant coefficient surface, this will result in substantial lengths of time at or near the optimal pressure for the road surface, maximizing vehicle braking efficiency. If, upon reaching the previously established optimum pressure, the wheel cycle has not proceeded to approach incipient lock, the system recognizes that the road surface coefficient has increased. It then rapidly increases pressure until an incipient lock condition is present, quickly establishing a new optimum pressure for the operating surface.

DESCRIPTION OF THE DRAWINGS

The invention may be best understood by referencing the following description of the preferred embodiment and the drawings in which.

DESCRIPTION OF THE PREFERRED EMBODIMENT

Figure 1:
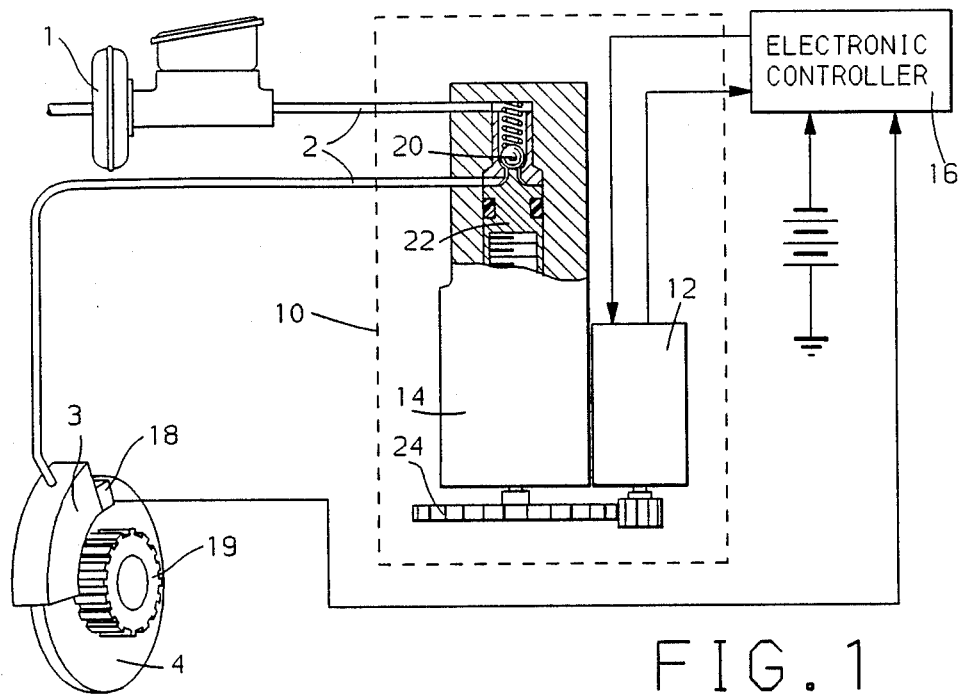
FIG. 1 is a general diagram of a braking system for controlling the brakes in accord with the principles of the invention.

An overview of the preferred embodiment is detailed in FIG. 1. The vehicle braking system is composed of a hydraulic boost unit 1 and brake lines 2 going to the wheel brake, such as a caliper 3 located at the rotor 4, of a vehicle wheel. With the addition of the antilock control system, the total vehicle braking system is comprised of (a) an electronic controller 16, (b) a wheel speed sensor assembly 18 mounted at the wheel near (c) an exciter ring 19, and (d) a modulator assembly 10 described by the following mechanical relationships: (1) a DC motor 12 drives a gear train 24, turning a ball screw actuator 14, which is composed of a linear ball screw and nut; (2) as the linear ball screw rotates, the nut is moved either forward or backward; (3) when the DC motor drives the linear ball screw in the apply direction, the nut moves forward and the piston 22 is applied toward the top of travel; (4) the check ball 20 is unseated and held open when the piston 22 is at the top of travel; (5) when the DC motor 12 is reversed, the linear ball screw rotates in the opposite direction and the nut moves backward, allowing the piston 22 to be backdriven by wheel brake pressure; (6) the check ball 20 seats when the piston is allowed to leave the top of travel, effectively isolating the base brake boost 1 from the wheel brake.

The antilock control system in this embodiment is operative at all times while the vehicle is in operation. As the vehicle wheel rotates, the excitor ring 19 rotates, causing the wheel speed sensor 18 to generate a signal proportional to the wheel speed. The signal is sent from the wheel speed sensor 18 to the electronic controller 16 for processing. The ball screw actuator 14, as shown in FIG. 1, is in the passive mode with the check ball 20 held open by the piston 22 at the top of travel. When the driver of the vehicle applies the brakes, with antilock passive, the hydraulic fluid can pass through the brake line 2 past the check ball 20 and through to the wheel brake caliper 3. Thus the antilock system is said to be transparent during normal braking.

The antilock control system detects incipient wheel lockup based upon the parameters of vehicle wheel slip and wheel deceleration. The information from the wheel speed sensor 18 is used by the electronic controller 16 to calculate wheel slip and acceleration. Upon detecting high wheel slip or deceleration, indicative of an incipient wheel lock condition, the controller 16 initiates antilock activity. The electronic controller 16 commands the DC motor 12 to reverse the ball screw actuator 14, causing the piston 22 to retract and the check ball 20 to seat, isolating the boost portion 1 of the hydraulics from the wheel brake. As the piston 22 retracts, pressure at the wheel brake is relieved allowing the wheel to begin to recover. Upon sensing wheel recovery, the controller 16 commands the motor 12 to reapply pressure, causing the ball screw actuator 14 to move forward, applying the piston 22 and returning fluid back to the wheel brake caliper 3. Wheel brake pressure is then increased toward the optimal pressure for the road surface. When the wheel again begins to approach lock, the wheel cycle process is repeated. A wheel cycle is defined as beginning with the detection of incipient lock and the subsequent release of pressure and ending when the pressure has been reapplied to the point just prior to incipient lock. During this wheel cycling process, the power consumed by the electric DC motor 12 while increasing pressure is directly proportional to the rotational torque exerted by the motor on the gear train 24. The rotational torque is translated through the linear ball screw and nut as a linear force to the piston head 22. The pressure present at the piston head is proportional to the wheel brake pressure. Thus, given (a) the equation $W=I^2R$ relating motor power, W, to motor current, I, and resistance, R, and (b) the above mechanical relationships, the current draw, I, of the motor 12 can be considered proportional to the wheel brake pressure, P.

Figure 2:
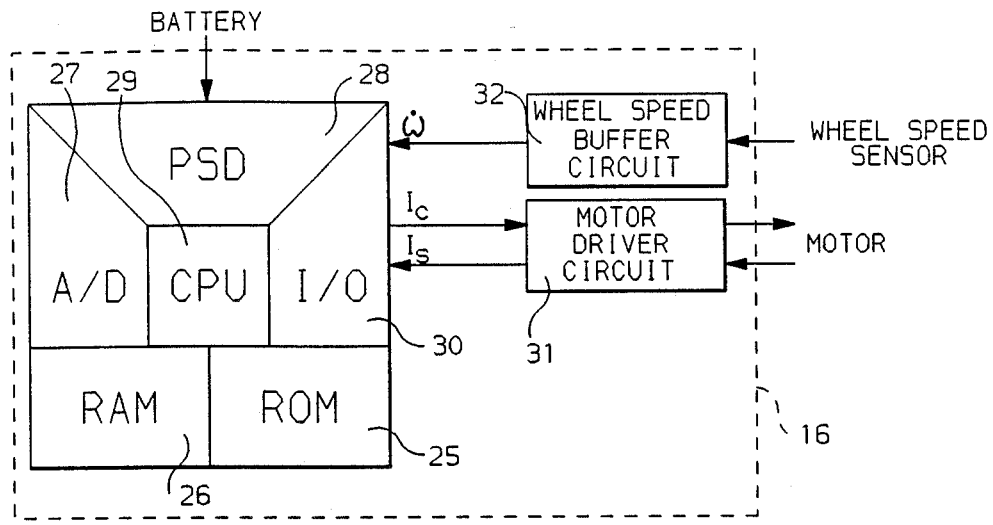
FIG. 2 is a diagram of the electronic controller.

Based on the stated relationship between motor current, I, and wheel brake pressure, P, the electronic controller 16 implements instructions to achieve the desired wheel brake pressure. As shown in FIG. 2, the electronic controller 16 consists of (a) a common digital computer composed of read-only memory (ROM) 25, random access memory (RAM) 26, analog-to-digital conversion ports (A/D) 27, a power supply device (PSD) 28, an instruction processing architecture embodied in the central processing unit (CPU) 29, and input/output ports (I/O) 30 which interface to the (b) motor drier circuit 31 and (c) wheel speed sensor buffer circuit 32.

Figure 3:
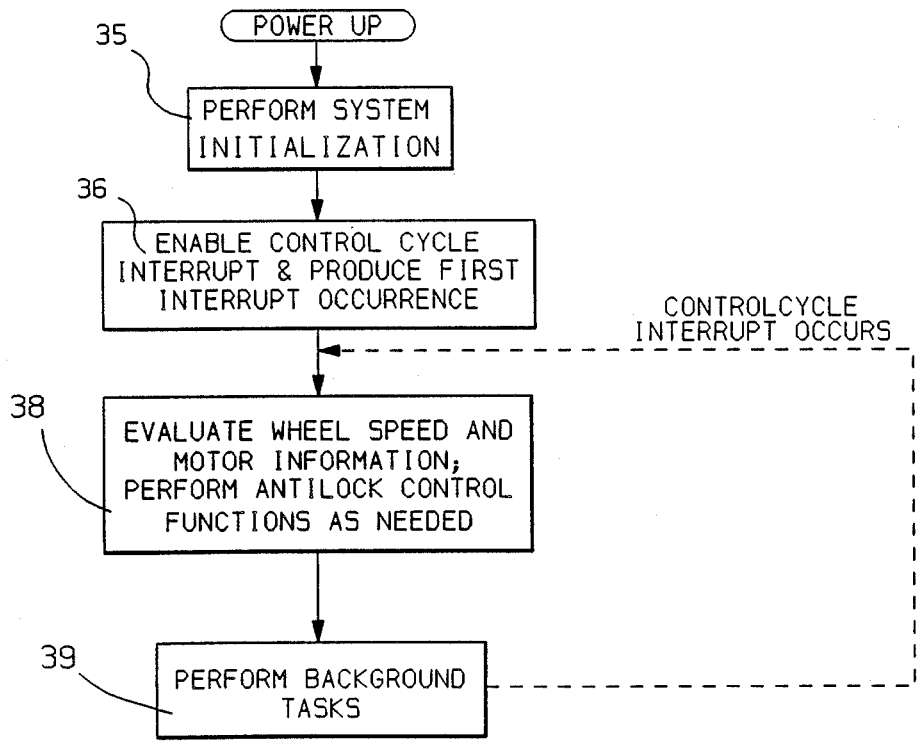
FIGS. 3 and 4 are flowcharts detailing the operation of the electronic controller.
Figure 4:
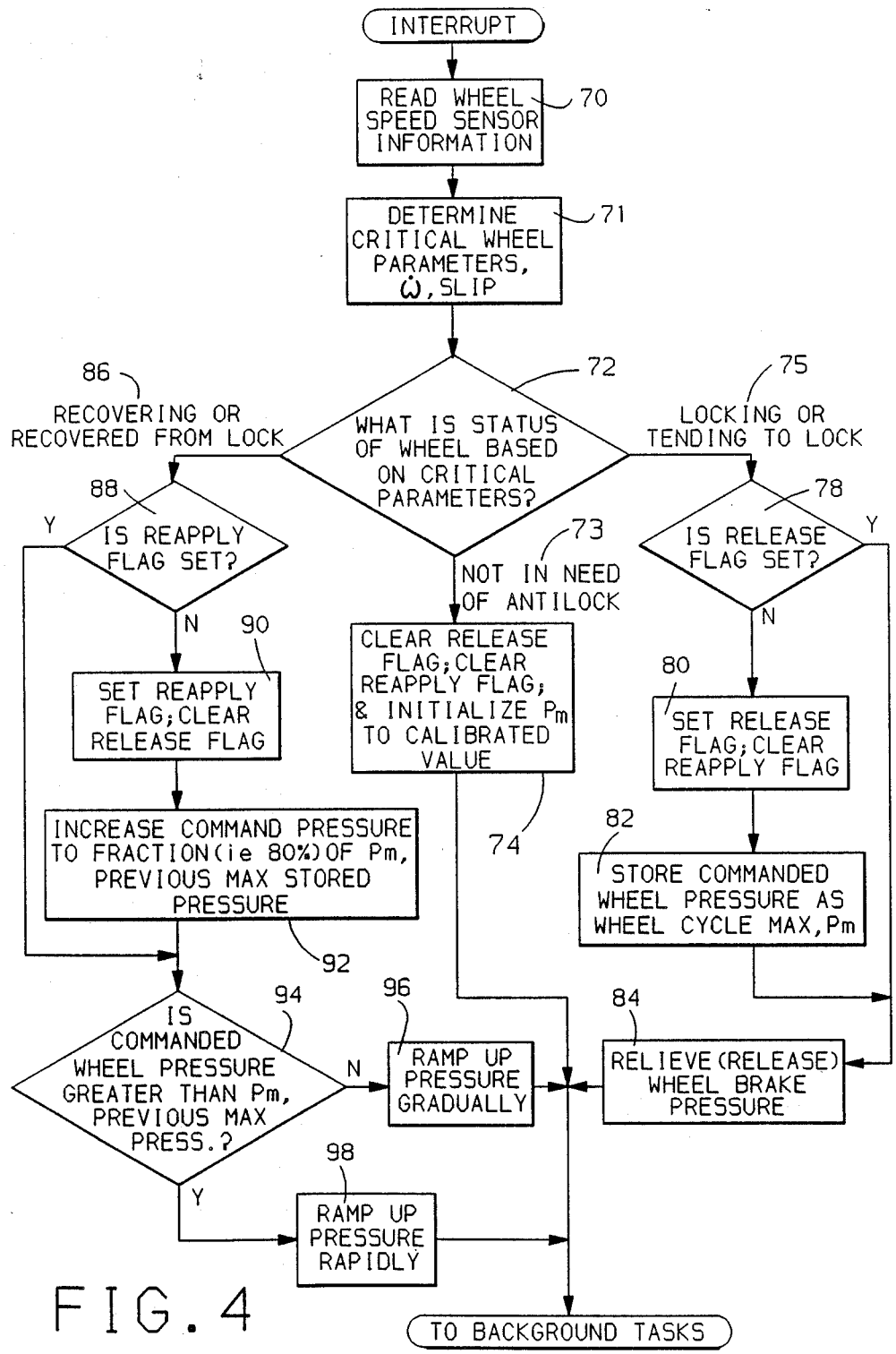

The ROM 25 contains the instructions necessary to implement the algorithm diagrammed in figures 3 and 4. It should be noted that in describing the functions of the algorithm encoded in the ROM, references to tasks which have been detailed as flow diagram function blocks will be designated by <nn>, where nn is the diagram reference number and < > indicates that the concept described by the particular flow diagram function block text is being referenced. The text in the flow diagram function block is intended to describe the general task or process being executed by the controller at that point. The text does not represent the actual ROM instructions. It is recognized that there are a variety of known information-processing languages available to one skilled in the art to construct the actual instructions necessary to accomplish the tasks described by the text in the flow diagram function blocks.

When the antilock system is powered-up, via the vehicle ignition or other means, the controller 16 will begin executing the instructions coded in ROM 25. As shown in FIG. 3, the controller 16 will first perform system initialization <35>, which entails clearing registers, initializing specific RAM variables to calibrated values, stabilizing voltage levels at the A/D and other basic functions of the digital computer. The system initialization process also includes insuring the linear ball screw actuator 14 is in the passive, or as earlier described, the transparent, mode shown in FIG. 1. The actuator is said to be transparent to the base braking functionality of the vehicle while the check ball 20 is unseated and is held open by the piston 22, allowing hydraulic boost 1 to reach the wheel brake.

Once the system has been initialized, the controller 16 will enable the control cycle interrupt <36>. The control cycle interrupt provides a means for accurately calculating the critical vehicle parameters of wheel slip and acceleration by insuring that the time between calculations, $t_c$, is fixed at a value such as 5 msec. Once a control cycle interrupt has occurred, the controller 16 proceeds through the major loop referred to as the "control cycle". During the control cycle, the controller performs both brake control processing tasks <38> and background tasks <39>. The brake control tasks include: reading and processing the wheel speed and DC motor signal information, determining whether antilock control is necessary, and performing antilock control functions as needed. Whether or not antilock control is required, the controller always evaluates wheel speed and motor signal information. After executing the brake control tasks, the controller proceeds to the background tasks <39>. The background tasks consist of diagnostic self-check activities and communication with off-board devices such as other vehicle controllers or service tools. All of these control cycle tasks are performed once every control cycle interrupt. Upon receiving a control cycle interrupt, the controller executes the brake control functions <38> and background tasks <39>. Thus, every control cycle, the controller evaluates the need for antilock activities, performs these activities as needed, and carries out diagnostic and off-board communications activities.

Figure 5:
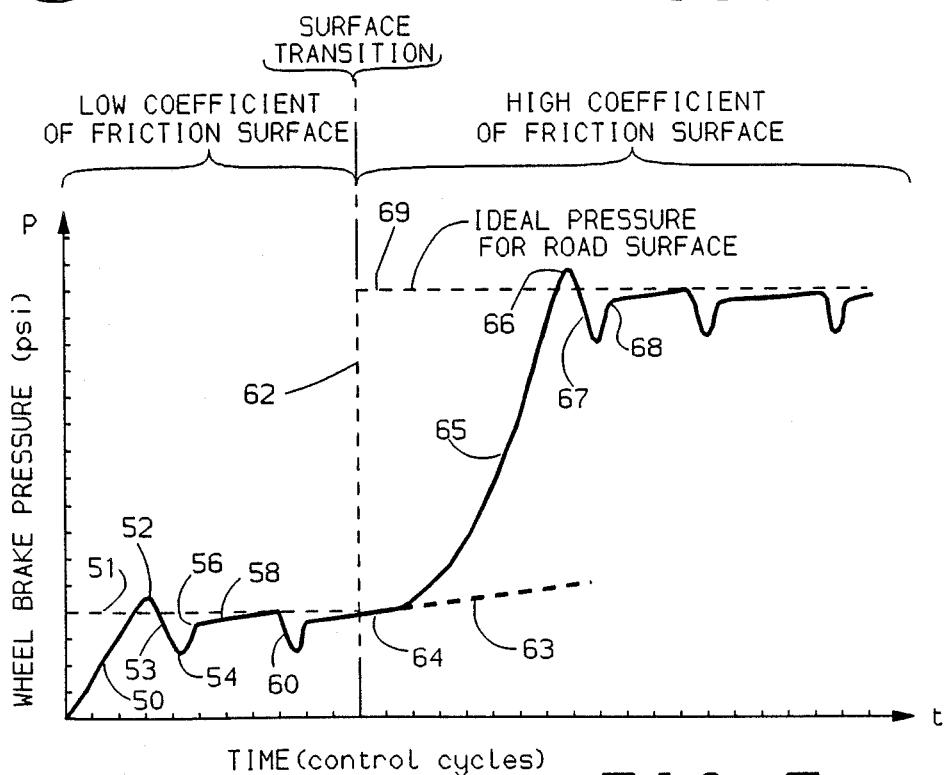
FIG. 5 is an illustration of wheel brake pressure in response to the operation of the electronic controller.

Turning now to FIG. 4, the steps necessary to implement the general brake control functions <38> are detailed. Additionally, FIG. 5 diagrams the resultant wheel brake pressure produced by the antilock control system while operating on a changing coefficient of friction surface. When the driver of the vehicle begins braking, fluid is applied to the wheel brake. As the wheel brake pressure increases as depicted in FIG. 5 by pressure 50, the wheel will begin decelerating. As explained earlier, the controller 16 is operative at all times, and executes the instructions encoded in ROM within the confines of the control cycle interrupt. Thus, the controller 16, upon receiving a control cycle interrupt, reads the wheel speed sensor information <70> and calculates the critical parameters of wheel slip and acceleration <71>. While the wheel brake pressure is at a value substantially below the optimal pressure for the initial road surface indicated as pressure level 51, the status of the critical parameters <72> will indicate antilock control is not necessary <73>. The controller subsequently clears the release and reapply flags and initializes the optimum pressure value, $P_m$, to a calibrated value <74>. The controller continues the control cycle, proceeding to the background tasks. Since no antilock activities were initiated, the actuator remains in the transparent mode. Given that the driver of the vehicle continues to apply the brakes, wheel brake pressure increases toward, and soon surpasses, the optimal pressure. This phenomenon is depicted in FIG. 5 by pressure 52 which is greater than pressure level 51.

Once wheel brake pressure exceeds the optimal pressure for the road surface, the wheel rapidly approaches lock. With the beginning of the control cycle, the controller again reads the wheel speed information <70>, calculates wheel slip and acceleration <71>, and evaluates the status of the critical parameters <72>. At this point, the critical parameters indicate an incipient lock condition <75>. Having determined to initiate antilock activities, the controller first evaluates the status of the release flag <78>, which, based upon the prior control cycle activity, is clear. Note that whenever the release flag is clear, it is indicating that the system was not performing a release during the prior control cycle. Conversely, whenever the reapply flag is clear, it is indicating that a reapply was not being performed during the prior control cycle. Keeping with the purpose of these flags, the release flag is set and the reapply flag is cleared <80>. Having determined that the wheel is approaching lock and that the system was not already performing a release, the controller stores the most recent commanded pressure, $P_m$, which is the optimum pressure for the road surface <82>. This optimum pressure is the maximum wheel brake pressure achieved during the wheel cycle, and represents the pressure required to produce incipient wheel lock. Due to the mechanical relationships previously related, the wheel brake pressure is proportional to the motor current. The motor current draw, $I_s$, as sensed by the controller 16 through the motor driver circuit 31, can be considered representative of actual wheel brake pressure, $P_m$, and is stored as such.

It should be reiterated that in this embodiment, the actuator is in the transparent mode prior to initiating antilock activities. Due to this feature, a calibrated value is stored as $P_m$ for this first wheel cycle. The calibrated value for $P_m$ was established during the previous control cycle when antilock control activity was not required (flow diagram path <72>-<73>-<74>). During later wheel cycles, i.e. after the initiation of antilock activities, the actuator is no longer transparent. Referring to the earlier description of the modulator 10, the DC motor 12 will now be driving the actuator 14. Thus the actual value of $I_s$, rather than a calibrated value, is stored in $P_m$ during later wheel cycles.

Returning to the description of the path <72>-<75>-<78>-<80>-<82>, the controller 16 commands the actuator to release wheel brake pressure <84>. This is accomplished by rotating the motor 12 in the reverse direction, which retracts the piston 22, seats the check ball 20, isolates the wheel brake from the boost 1 and relieves pressure at the wheel brake. The resulting release of wheel brake pressure is diagrammed in FIG. 5 as the decreasing pressure rate 53. The controller completes the control cycle by proceeding to execute the background tasks.

Governed by the control cycle interrupt, the controller continues to read wheel speed information <70>, calculate critical wheel parameters <71>, and evaluate the status of the critical parameters <72> every interrupt control cycle. While the wheel is still tending to lock <75>, the release flag remains set (as it was set during the first time through this path) and the controller proceeds from determining the status of the release flag <78> directly to relieving wheel brake pressure <84>, and does not disturb the stored value of $P_m$.

Eventually, sufficient pressure will be relieved to allow wheel recovery. This point is indicated on FIG. 5 as wheel brake pressure 54. With the beginning of another control cycle, the controller proceeds, as usual, through steps <70>, <71> and <72>, and determines that the critical parameters indicate the wheel is now experiencing recovery <86>. The controller next evaluates the status of the reapply flag <88>, which, based upon the prior control cycle activity, is clear. Keeping with the purpose of the reapply and release flags, the reapply flag is set and the release flag is cleared <90>. Since the wheel is recovering, pressure can be reapplied to the wheel brake. The controller initiates the reapply by commanding a significant fraction of the previously stored maximum pressure, $P_m$. Thus, a significant fraction of the optimum pressure for the road surface <92> is commanded. By beginning the reapply from a significant fraction of the optimum pressure, braking efficiency is maintained. Given that the commanded pressure is a significant fraction of $P_m$, it is inherently less than $P_m$ <94>. While the commanded pressure is less than $P_m$, the system slowly increases pressure <96>. The initial reapply to a significant fraction of $P_m$ and the gradual increase of pressure from that point are shown in FIG. 5 as pressure value 56 and pressure rate 58.

After pressure has been substantially increased, the wheel will cease to recover and begin to approach lock, repeating the wheel cycle process. This is indicated on FIG. 5 by the wheel pressure reaching the optimum pressure for the road surface 51, and subsequently being released at rate 60 to avoid wheel lock. This activity corresponds to the controller deciding, during successive control cycles which always include the computational and decision steps of <70>, <71> and <72>, that antilock activity should proceed through path <86>-<88>-<94>-<96> until the wheel ceases to recover and begins approaching lock, at which point path <75>-<78>-<80>-<82>-<84> is entered.

The controller continues along path <75>-<78>-<84> until the wheel again recovers.

While the vehicle is operating on any given road surface, there is a unique wheel brake pressure corresponding to the brake torque which will produce the critical wheel slip value. As the vehicle travels along the road, it may encounter a change in road surface coefficient, indicated on FIG. 5 as surface transition 62. If the road surface coefficient increases, the previous optimal brake pressure needed to produce critical wheel slip, represented by pressure level 51, will no longer be effective on the higher coefficient surface. A new higher brake pressure must be achieved, represented by pressure level 69. As can be seen from FIG. 5, if the pressure continued to be increased at rate 64, represented by the extrapolated rate 63, a prolonged period of below optimal braking would occur. By increasing the pressure rapidly (rate 65), the optimum brake pressure for the new surface 69 is reached in a much shorter period of time.

To accomplish the pressure characteristics just described, the controller 16, while executing the control loop along the path <70>-<71>-<72> and <86>-<88>, compares the commanded pressure to the previously determined optimum pressure, $P_m$ <94>. If the surface coefficient had not increased, the controller would detect incipient lock prior to, or upon, reaching the optimum pressure, $P_m$. However, if no incipient wheel lock condition is present upon reaching the previous optimum brake pressure, the controller determines that a change to a higher coefficient road surface has been experienced. The controller 16 commands the DC motor 12 to rapidly increase brake pressure. This allows the system to quickly adapt to the change to a higher coefficient surface. As brake pressure increases rapidly, the controller 16 will continue to operate within the control cycle interrupt structure, proceeding along path <70> through <72> and <86>-<88>-<94>-<98>.

After the new optimal pressure has been exceeded, as shown in FIG. 5 by pressure value 66, the wheel will begin to approach incipient lock. The controller detects the incipient lock condition, and begins proceeding along path <75>-<78>-<80>. Upon reaching step <82>, the controller stores $P_m$, which represents the optimum pressure for the new road surface. Having begun another wheel cycle, the controller releases pressure until the wheel begins to recover. When the controller initiates the next reapply sequence, it increases brake pressure to a significant fraction of $P_m$, which allows the system to maximize braking efficiency on the new higher coefficient road surface in the same manner as the system maximized braking efficiency on the lower coefficient surface. Thus, braking efficiency is maximized not only while operating on a constant coefficient surface, but during transitions between lower and higher coefficient surfaces as well.

The foregoing description of a preferred embodiment for the purpose of illustrating the principles of this invention is not to be considered as limiting or restricting the invention since many modifications may be made by the exercise of skill in the art without departing from the scope of the invention.

The embodiments of the invention in which an exclusive property or privilege is claimed are defined as follows:

1. A method of limiting the brake pressure applied to the brake of a wheel traveling over a road surface to limit wheel slip between the wheel and the road surface, the method comprising the steps of:
    (a) detecting an incipient wheel lock condition resulting from the value of slip between the wheel and road surface exceeding a critical slip value;
    (b) storing a value representative of the brake pressure at which the incipient wheel lock condition is initiated;
    (c) lowering the brake pressure in response to the detected incipient wheel lock condition to allow the wheel to recover from the incipient wheel lock condition;
    (d) re-establishing brake pressure following wheel recovery to a value that is a predetermined fraction of the brake pressure represented by the stored value; and
    (e) ramping the brake pressure until an incipient wheel lock condition is again sensed at step (a), the brake pressure being ramped (1) at a first rate when the brake pressure is less than the pressure represented by the stored value and (2) at a second rate greater than the first rate when the brake pressure is greater than the pressure represented by the stored value, the second rate providing for a rapid increase in the brake pressure from the pressure corresponding to the stored value in response to an increase in the friction coefficient between the wheel and the road surface.

2. A wheel lock control system for limiting the brake pressure applied to the brakes of a wheel traveling over a road surface to limit the slip between the wheel and the road surface, the system comprising in combination:
    means for detecting an incipient wheel lock condition resulting from the value of slip between the wheel and road surface exceeding a critical slip value;
    means for storing a value representative of the brake pressure at which the incipient wheel lock condition is initiated;
    means for lowering the brake pressure in response to a detected wheel lock condition to allow wheel recovery from the incipient wheel lock condition;
    means for re-establishing brake pressure following wheel recovery to a value that is a predetermined fraction of the brake pressure represented by the stored value; and
    means for ramping the brake pressure until an incipient wheel lock condition is again detected, the brake pressure being ramped (1) at a first rate when the brake pressure is less than the pressure represented by the stored value and (2) at a second rate greater than the first rate when the brake pressure is greater than the pressure represented by the stored value, the second rate providing for a rapid increase in the brake pressure from the pressure corresponding to the stored value in response to an increase in the friction coefficient between the wheel and the road surface.

3. A wheel lock control system for limiting pressure applied to the brake of a wheel traveling over a road surface to maintain braking effectiveness when the friction characteristics of the road surface change, comprised of:
    means for detecting an incipient wheel lock condition resulting from the value of slip between the wheel and the road surface exceeding a critical slip value;
    means for storing a value representing the brake pressure at which the incipient wheel lock is initiated;

means for relieving brake pressure at the wheel brake to allow wheel recovery;

means for increasing brake pressure following wheel recovery until an incipient wheel lock condition is sensed by (a) increasing brake pressure slowly when the brake pressure is less than the stored value, and (b) increasing brake pressure rapidly when the brake pressure is greater than the stored value.

* * * * *